United States Patent Office 3,401,812
Patented Sept. 17, 1968

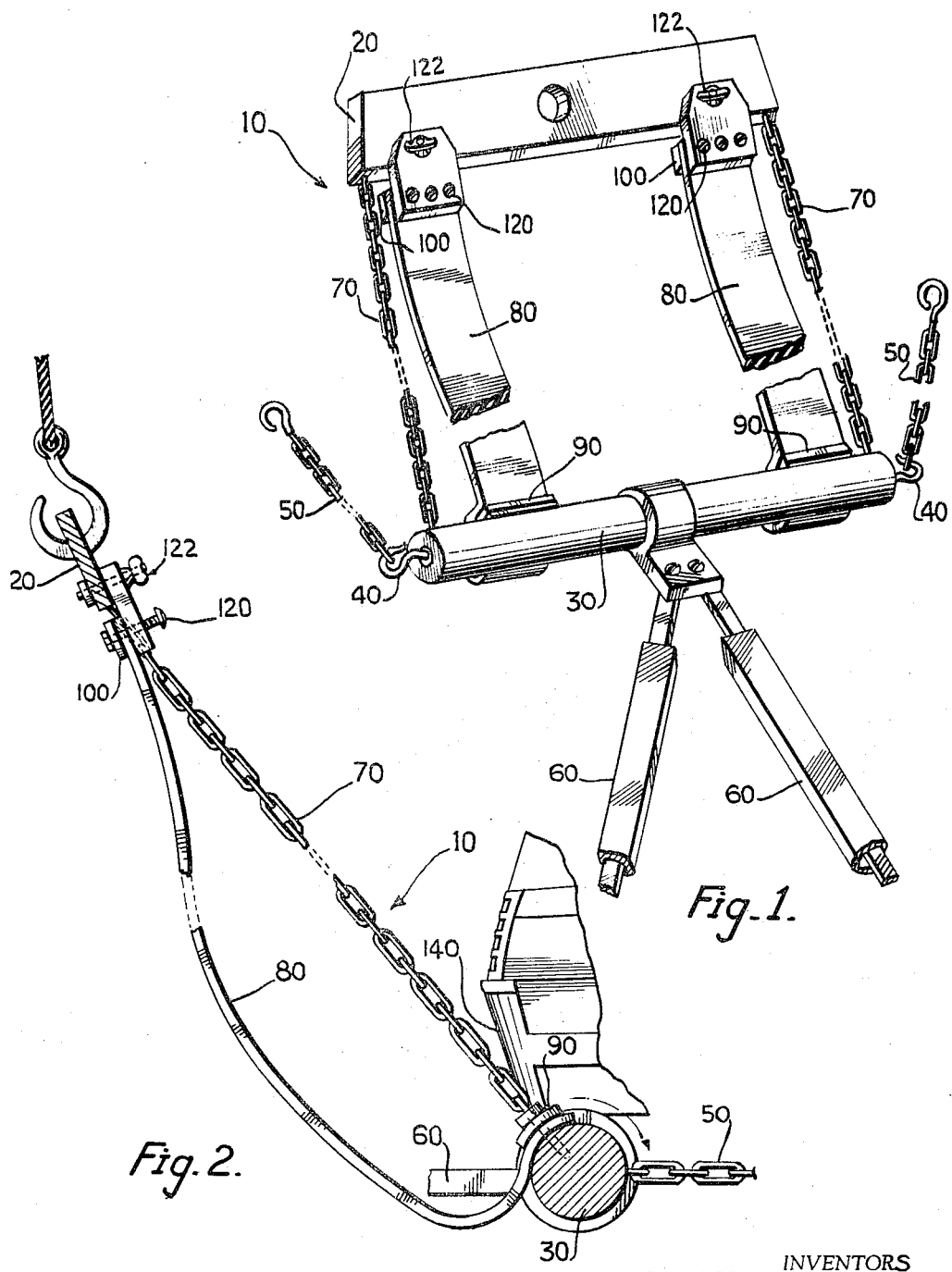

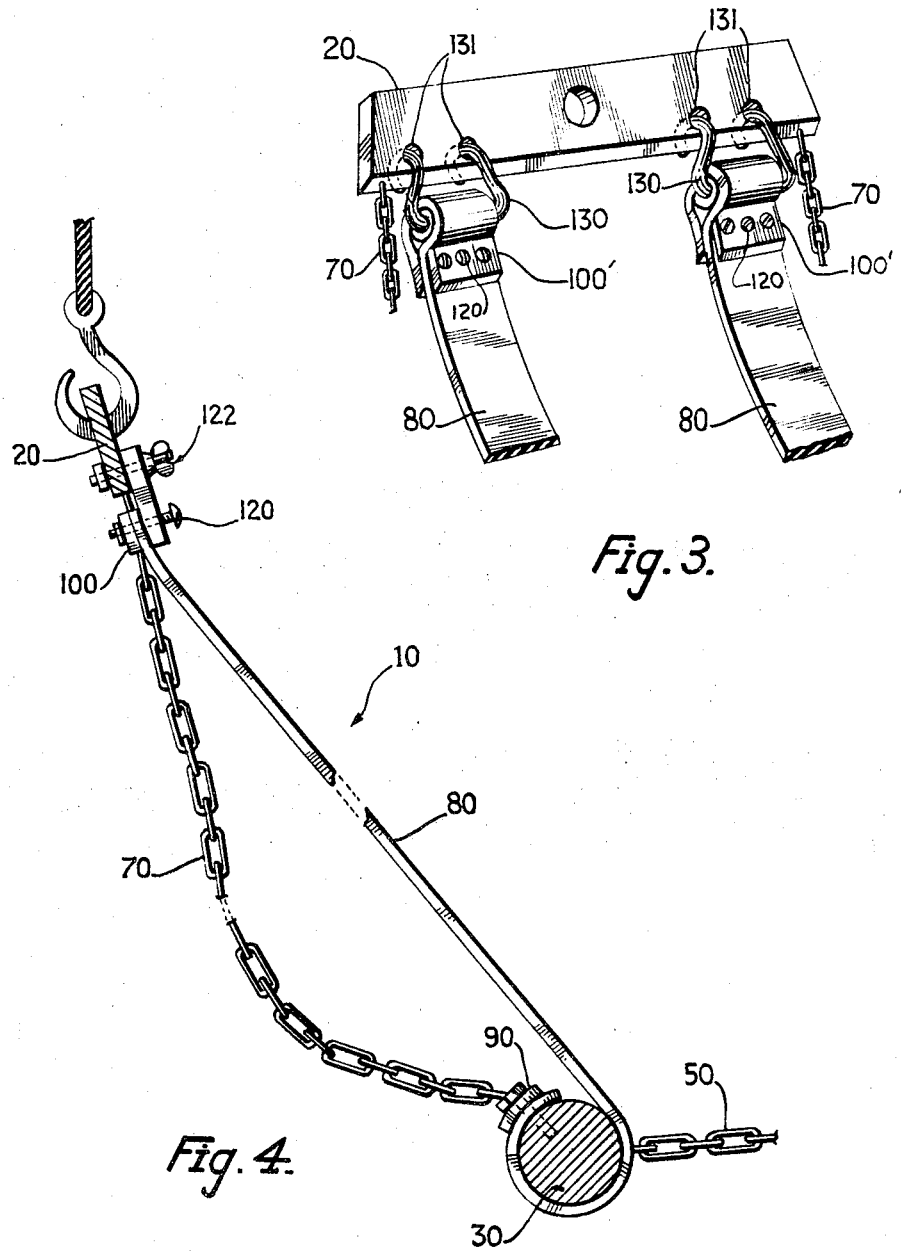

3,401,812
LIFTING AND TOWING APPARATUS
Edward E. Wegener and Thure H. Wegener, both of Cranbury-South River Road, Cranbury, N.J. 08512
Filed Jan. 3, 1967, Ser. No. 606,812
8 Claims. (Cl. 214—86)

ABSTRACT OF THE DISCLOSURE

The disclosure is of vehicle towing apparatus which includes upper and lower bars between which are secured a pair of chains and a pair of flexible belts. The belts can be detached from the upper bar and they can be wrapped around or unwrapped from the lower bar so that they can be made either longer or shorter than the chains. The shorter members, the chains or belts, cradle the vehicle being raised and towed.

This invention relates to lifting and towing apparatus for use in lifting and towing disabled vehicles.

At the present time, apparatus known as tow bars are used by towing vehicles or wreckers for raising and towing disabled vehicles or wrecks as they are known. The best tow bars include (1) flexible rubber or leather straps or slings for cradling a vehicle which is not damaged and which has parts to be protected, and (2) chains which are used to perform the cradling function in place of the slings when the vehicle is damaged and when it is desired to protect the slings. Several arrangements are available for interchanging the slings and chains as required, and the present invention provides another arrangement which is most enconomical in the number of parts required and is particularly useful if it is desired to modify tow bars which are already in use.

Briefly, a tow bar embodying the invention includes an upper lifter bar and a lower anchor bar which may be of any conventional form. The tow bar also includes a pair of chains secured between the lifter and anchor bars, and a pair of flexible slings or belts secured between the two bars. The slings are fixed to the lower anchor bar and removably secured to the upper lifter bar, and they are of such a length that, when it is desired to use the slings to raise a wreck, the upper ends thereof are removed from the lifter bar, and the slings are wrapped around the anchor bar and re-connected to the lifter bar. This wrapping operation shortens the slings sufficiently so that they, rather than the chains, cradle the wreck. When it is desired to use the chains, the upper ends of the slings are removed, and they are unwrapped from the anchor bar whereby they hang free and loose and completely out of contact with the wreck. In this state, the slings are longer than the chains, and the chains cradle the wreck.

The invention is described in greater detail by reference to the drawing wherein:

FIG. 1 is a perspetcive view of the invention;
FIG. 2 is a side elevational view of the apparatus of FIG. 1 as it appears in one mode of operation;
FIG. 3 is a perspective view of a modification of the apparatus of FIG. 1; and
FIG. 4 is a side elevational view of the apparatus of FIG. 1 as it appears in another mode of operation.

A tow bar 10 embodying the invention includes an upper lifter bar 20 which is a strong, rigid metal plate or tube, and a lower anchor bar 30 which is also of metal and is generally tubular or cylindrical in form. The anchor bar 30 includes at its ends, grab hooks 40, by means of which it is connected through chains 50 to the undercarriage of a vehicle, the "wreck" to be raised. A telescoping V-shaped spacer bar assembly 60, of the type shown in U.S.P. 2,913,131, is also usually coupled between the anchor bar and the towing vehicle, the "wrecker," to maintain the desired spacing between the wrecker and the wreck during a towing operation.

The two bar 10 also includes two chains 70 connected between the anchor and lifter bars 20 and 30, preferably near their ends. The chains may be removable, or they may be fixed in place, for example, by welding. The tow bar 10 also includes, according to the invention, two flexible slings or belts 80 of rubber, leather, fabric, or the like. Each sling has one lower end secured to the anchor bar, for example, by means of a metal plate 90 bolted or welded to the bar, with the end of the sling held between the plate 90 and the bar 30. This end of each belt or sling is secured to the bar 30 at a location on its circumference which causes it to face away from, and be remote from and out of contact with, the wreck. The upper end of each belt is provided with an assembly of apertured metal plates or brackets 100 to which the belts are secured by bolts 120 or the like and by which the belts are removably secured to the lifter bar. This removable coupling may be achieved, for example, by providing the lifter bar 20 and the bracket 100 with alignable apertures in which a quick-disconnect pin 122 or the like can be inserted. In another arrangement shown in FIG. 3, each belt might be provided with a bracket 100' having hooks 130 to engage apertures 131 in the lifter bar.

As is well known in the art, the tow bar 10 is coupled to the wreck, with the lower bar 30 engaging the bumper 140 of a wreck (FIG. 2). Suitable engageemnt is achieved by placing the lower bar 30 just under and behind the bumper of the wreck, and then the chains 50 are connected to any suitable portion of the undercarriage of the wreck (not shown). In the arrangement shown in FIG. 2, the spacer bar assembly 60 extends from lower bar 30 to the left to the wrecker (not shown).

According to the invention, the belts or slings 80 are of such length that, when they are connected as shown in FIGS. 1 and 2 and the tow bar is coupled to a wreck which has been damaged and has jagged metal parts, the slings extend from the anchor bar to the lifter bar and they hang loose out of contact with the wreck. The slings in this configuration are of greater length than the chains 70 so that the wreck is cradled by the chains 70 which extend from bar 30 generally vertically in contact with the bumper of the wreck to the upper bar 20. In this case, it can be seen that the wreck does not contact the slings which hang loose and thus are protected from jagged metal parts.

However, if the wreck is not damaged and the bumper or other parts must be protected and cannot be raised by the chains 70, then the slings 80 are wrapped around the anchor bar as shown in FIG. 4 and then are connected to the lifter bar 20. Now the slings are shorter than the chains 70 so that the chains hang loose and the slings contact and cradle the wreck (not shown). The belts thus contact the bumper or other parts, and the wreck can be towed without marring or damaging chrome or paint. At the same time, since no jagged parts are present on the wreck, the belts are not damaged.

What is claimed is:
1. A tow bar including
   a lower anchor bar adapted to engage a portion of a wreck,
   a lifter bar adapted to be connected to a lifting crane on a wrecker, a pair of chains having ends adapted to be connected to said anchor and lifter bar, respectively,
   a pair of flexible slings each having one end secured to said anchor bar,
   the other ends of said slings being detachably secured to said lifter bar, means for detachably securing said other ends of said slings to the lifter bar,
   said slings being longer than said chains and of such length that they can be wrapped around the anchor bar and made shorter than said chains so that when a wreck is raised, the slings contact and cradle the wreck and not the chains, the slings, when unwound, hanging loosely between the lifter bar and the anchor bar remote from the wreck and being longer than the chains so that the chains cradle a wreck and not the slings.

2. The tow bar defined in claim 1 wherein said one end of each sling is secured to said anchor bar at a position on the circumference of said anchor bar such that when said slings hang lose and unwound, they do not touch the wreck during a lifting operation.

3. The tow bar defined in claim 1 and including a spacer bar secured to said anchor bar at one end and adapted to be secured at its other end to a wrecker.

4. The tow bar defined in claim 1 and including means on said anchor bar for securing it to a portion of a wreck.

5. The tow bar defined in claim 1 and including a pair of grab hooks on said anchor bar from which chains can be secured to a portion of a wreck.

6. The tow bar defined in claim 1 wherein each sling includes at its upper end a bracket and securing means for detachably securing said bracket to said lifter bar.

7. The tow bar defined in claim 6 wherein said securing means comprises a quick-disconnect pin.

8. The tow bar defined in claim 6 wherein said securing means comprises hook-like members secured to said brackets and engaging holes in said lifter bar.

References Cited

UNITED STATES PATENTS 2,913,131 11/1959 Holmes _____ 214—86
3,182,828 5/1965 Ormsby _____ 214—86

ALBERT J. MAKAY, *Primary Examiner.*